United States Patent
Mizutani et al.

(10) Patent No.: US 6,761,461 B2
(45) Date of Patent: Jul. 13, 2004

(54) SPREAD ILLUMINATING APPARATUS WITHOUT LIGHT CONDUCTIVE BAR

(75) Inventors: Hitoshi Mizutani, Iwata-gun (JP); Shingo Suzuki, Iwata-gun (JP); Motoji Egawa, Iwata-gun (JP)

(73) Assignee: Minebea Co., Ltd., Kitasaku-gun (JP)

(*) Notice: Subject to any disclaimer, the term of this patent is extended or adjusted under 35 U.S.C. 154(b) by 67 days.

(21) Appl. No.: 10/294,821

(22) Filed: Nov. 15, 2002

(65) Prior Publication Data

US 2003/0090888 A1 May 15, 2003

(30) Foreign Application Priority Data

Nov. 15, 2001 (JP) .......................................... 2001-350161

(51) Int. Cl.[7] .......................... F21V 8/00; G02F 1/1335
(52) U.S. Cl. .......................................... 362/31; 349/65
(58) Field of Search .............................. 362/31; 349/65

(56) References Cited

U.S. PATENT DOCUMENTS

| 6,582,095 B1 | * | 6/2003 | Toyoda ........................ 362/235 |
| 6,603,520 B2 | * | 8/2003 | Umemoto et al. ............ 349/65 |
| 6,631,998 B2 | * | 10/2003 | Egawa et al. ................. 362/31 |
| 6,652,109 B2 | * | 11/2003 | Nakamura ..................... 362/31 |
| 6,669,350 B2 | * | 12/2003 | Yamashita et al. ............. 362/31 |

FOREIGN PATENT DOCUMENTS

| JP | A 2000-11723 | 1/2000 | .................... 362/31 |
| JP | 02000011723 A | * 1/2000 | .................... 362/31 |
| JP | A 2001-35222 | 2/2001 | .................... 362/31 |
| JP | 02001035222 A | * 2/2001 | .................... 362/31 |

* cited by examiner

*Primary Examiner*—Stephen Husar
*Assistant Examiner*—James Cranson
(74) *Attorney, Agent, or Firm*—Oliff & Berridge, PLC

(57) ABSTRACT

A spread illuminating apparatus includes a light conductive plate provided with a light entry face at its corner, having a spot-like light source disposed close to or in contact with the light entry face, and having a light reflection pattern formed on its major surface. The light reflection pattern comprises a plurality of arced grooves and is configured such that the grooves have their depths increasing with an increase in the distance from the light source, and that each of the grooves has its depth increasing with an increase in the light emission angle made by a line of a light emission direction with respect to a diagonal line from the light source. Thus, the light reflection pattern is adapted to reflect more light at an area farther from the light source and the diagonal line as well, thereby further improving uniformity in brightness all over the light conductive plate.

10 Claims, 7 Drawing Sheets

Fig. 9

|  | Point 27 | Point 28 | Point 29 | Point 30 | Point 31 | Point 32 |
|---|---|---|---|---|---|---|
| Emission Angle φ (degrees) | 0 | 0 | 0 | 38 | 52 | 38 |
| Distance L (mm) | 5 | 30 | 58 | 30 | 30 | 46 |
| Depth D (μm) | 0.580 | 4.245 | 18.228 | 10.897 | 16.964 | 22.740 |

SPREAD ILLUMINATING APPARATUS WITHOUT LIGHT CONDUCTIVE BAR

BACKGROUND OF THE INVENTION

1. Field of the Invention

The present invention relates to a spread illuminating apparatus, and more particularly to a spread illuminating apparatus used with a liquid crystal display.

2. Description of the Related Art

A liquid crystal display (hereinafter referred to as LCD), which is small in power consumption, low in profile, and light in weight, is heavily used in electric products such as a personal computer (hereinafter referred to as PC), a cellular phone, and the like, and is increasingly demanded.

Since a liquid crystal of the LCD does not emit light by itself, the LCD requires an illuminating means to radiate light on the liquid crystal when used in a place where sunlight or interior lighting is not fully available.

A PC, particularly notebook-type PC, and a cellular phone are required to be lower in profile and smaller in power consumption, and the requirements are fulfilled by a spread illuminating apparatus of side light type, an example of which is shown in FIG. 10 (disclosed in Japanese Patent Application Laid-open No. 2000-11723).

In FIG. 10, a spread illuminating apparatus 1 is disposed over a front shoe F (upper side of the figure) of a reflection-type liquid crystal element 2. The spread illuminating apparatus 1 comprises: a light conductive plate 3 shaped substantially rectangular and made of a light transmissible material; a light conductive bar made of a light transmissible material; and spot-like light sources 5, 5 such as light emitting diodes (LEDs).

The light conductive plate 3 has a major surface 6 (upper aide in the figure, hereinafter referred to as "top surface") which is an observing surface, and another major surface 7 (hereinafter referred to as "bottom surface") which faces the reflection-type liquid crystal element 2.

The light conductive bar 4 is disposed with its side surface 8 positioned close to or in contact with an end surface 9 of the light conductive plate 3, and has the light sources 5, 5 disposed on its both end surfaces 10, 10, respectively. The light conductive bar has an optical path conversion means 12 formed on its side surface 11 opposite to the side surface 8 facing the end surface 9 of the light conductive plate 3. The optical path conversion means 12 comprises a plurality of grooves 13 substantially triangular in section and a plurality of flat portions 14 present between adjacent grooves 13, 13, and is adapted to guide light rays emitted from the light sources 5, 5 toward the end surface 9 of the light conductive plate 3.

The light conductive plate 3 has a light reflection pattern 15 formed on the top surface 6. The light reflection pattern 15 comprises a plurality of grooves 16 shaped substantially triangular in section and extending parallel to the end surface 9 of the light conductive plate 3 and a plurality of flat portions present between adjacent grooves 16, 16, and is adapted to reflect light rays exiting out from the light conductive bar 4 toward the bottom surface 7.

In the spread illuminating apparatus 1 thus structured, light rays emitted from the light sources 5, 5 and introduced into the light conductive bar 4 have their optical paths changed at the optical path conversion means 12, and travel into the light conducive plate 3 through the end surface 9.

The light rays introduced into the light conductive plate 3 repeat reflections and reflections at the light reflection pattern 15 and other portions, progress toward an end surface opposite to the end surface 9, and exit out in the meantime from the bottom surface 7 to illuminate the reflection-type liquid crystal element 2 disposed close to the bottom surface 7, whereby the reflection-type liquid crystal element 2 performs emission (indirect emission) display function.

In the above described spread illuminating apparatus 1, the light rays emitted from the light sources 5, 5 are consumed while traveling inside the light conductive bar 4, and have their amounts decreased. To overcome this problem, a spread illuminating apparatus was disclosed in Japanese Patent Application Laid-open No. 2001-35222.

The spread illuminating apparatus disclosed therein is shown in FIG. 11. A light entry face 21 is provided at a corner 18 of a light conductive plate 3 so as to be substantially orthogonal to a line 20 (hereinafter referred to as "diagonal line") defined by connecting the corner 18 and a corner 19 diagonally opposite to the corner 18. A spot-like light source 5, for example an LED, is disposed close to or in contact with the light entry face 21. A light reflection pattern 15A is formed on a top surface of the light conductive plate 3. The light reflection pattern 15A comprises a plurality of arced grooves 16A and a plurality of flat portions 17A present between adjacent grooves 16A, 16A. The arced grooves 16A correspond to partial circumferences of circles which are concentric with one another about the light source 15 and which have respective different radii. Since this spread illuminating apparatus eliminates the light conductive bar 4 used in the apparatus shown in FIG. 10, light rays emitted from the light source 5 are introduced immediately into the light conductive palate 8, thereby preventing the loss of light conventionally incurred due to light traveling inside the light conductive bar 4.

Light rays are desired to exit out from the light conductive plates 3 in a uniform manner so as to ensure excellent illumination precision. For example, in the spread illuminating apparatus 1 disclosed in the aforementioned Japanese Patent Application Laid-open No. 2000-11723 (see FIG. 10), the grooves 16 of the light reflection pattern 15 have their depths increasing and/or have their in-between intervals decreasing with an increase in the distance from the light conductive bar 4. With this structure, light rays are reflected at the light refection pattern 15 toward the bottom surface 17 in a larger amount at a portion farther from the light conductive bar 14, whereby uniform emission is ensured all over the light conductive plate 3.

This is the case with the apparatus shown in FIG. 11, and the arced grooves 16A have their depths increasing and/or have their in-between intervals decreasing with an increase in the distance from the light source 5 in order to ensure uniform emission all over the light conductive plate 3. In this case, however, as shown in FIG. 12, the brightness decreases from an area positioned at and near the diagonal line 20 (hereinafter referred to as "diagonal line area") toward an area positioned circumferentially away from the diagonal line area, specifically the brightness decreases with an increase in the emission angle φ made by the light direction line with respect to the diagonal line 20. This happens because the LED as the light source 5 has a light emission characteristic shown in FIG. 12, where with a datum luminous intensity defined by the luminous intensity of an LED whose emission angle φ of a direction along the paper surface of FIG. 11 (X—X direction in FIG. 12) is 0° and whose emission angle (referred to also as "φ" for the sake of convenience) of a direction orthogonal to the paper surface of FIG. 11 (Y—Y direction in FIG. 12) is 0°, the ratio of the luminous intensity (relative luminosity) of the LED at a prescribed emission angle φ (X—X direction or Y—Y direction) to the datum luminosity intensity is taken along the ordinate and shown as a function of the emission angle φ taken along the abscissa. As shown in FIG. 12, the relative luminosity decreases gradually as indicated by the solid line while the emission angle φ (X—X direction) increases from 0°, hence the area corresponding to a larger emission angle φ has a lower luminous intensity in the spread illuminating apparatus shown in FIG. 11.

SUMMARY OF THE INVENTION

The present invention has been made in the light of the above, and it is an object of the present invention to provide a spread illuminating apparatus which ensures prevention of loss of light and improvement of illuminating precision In order to achieve the object, according to a first aspect of the present invention, the spread illuminating apparatus comprises: a light conductive plate shaped substantially rectangular and made of a light transmissible material; a spot-like light source disposed close to or in contact with a light entry face provided at a corner of the light conductive plate; and a light reflection pattern which is formed on a major surface of the light conductive plate, comprises a plurality of arced grooves corresponding to circumferences of circles being concentric with one another about the light source and having respective different radii, and which is configured such that the depths of the arced grooves increase with an increase in a distance from the light source, and/or such that the intervals between adjacent arced grooves decrease with an increase in a distance from the light source, while each of the arced grooves has its depth increasing continuously and gradually with an increase in a distance from a line orthogonal to the light entry face.

According to a second aspect of the present invention, in the spread illuminating apparatus of the first aspect, each of the arced grooves has its depth determined according to an angle made by the line orthogonal to the light entry face with respect to a line defined by connecting a point concerned and the light source.

According to a third aspect of the present invention, in the spread illuminating apparatus of the first or second aspect, the light reflection pattern further comprises a plurality of flat portions each present between any two adjacent ones of the arced grooves.

According to a fourth aspect of the present invention, in the spread illuminating apparatus of the first or second aspect, the light reflection pattern is configured such that the plurality of arced grooves are continuously arrayed.

According to a fifth aspect of the present invention, in the spread illuminating apparatus of any one of the first to fourth aspects, the plurality of arced grooves are shaped substantially triangular in section.

The spread illuminating apparatus according to the present invention eliminates the light conductive bar conventionally used, whereby light rays emitted from the light source are introduced directly into the light conductive plate, thus preventing the loss of light conventionally incurred due to light traveling inside the light conductive bar. Further, the light reflection pattern of the spread illuminating apparatus is structured such that not only the grooves have their depths increasing with an increase in the distance from the light source but also each of the grooves has its depth increasing continuously and gradually with an increase in the distance from the diagonal line, whereby the light reflection pattern reflects more light toward the front surface of the reflection-type liquid crystal element at an area positioned far from the light source and the diagonal line than at an area positioned at or close to the light source and the diagonal line, thus achieving further uniform spread emission all the way over the light conductive plate, resulting in improvement of illuminating precision.

BRIEF DESCRIPTION OF THE DRAWINGS

FIG. 9 is a table showing an emission angle, a distance from a light source, and a groove depth at each of six points on a light conductive plate of an example apparatus according to the present invention;

DESCRIPTION OF THE PREFERRED EMBODIMENTS

The present invention will be described with reference to FIGS. 1 to 4. In FIGS. 1 to 4, a spread illuminating apparatus 1B is disposed over a front surface F (display surface) of a reflection-type liquid crystal element 2 (see FIG. 10).

Figure 1:
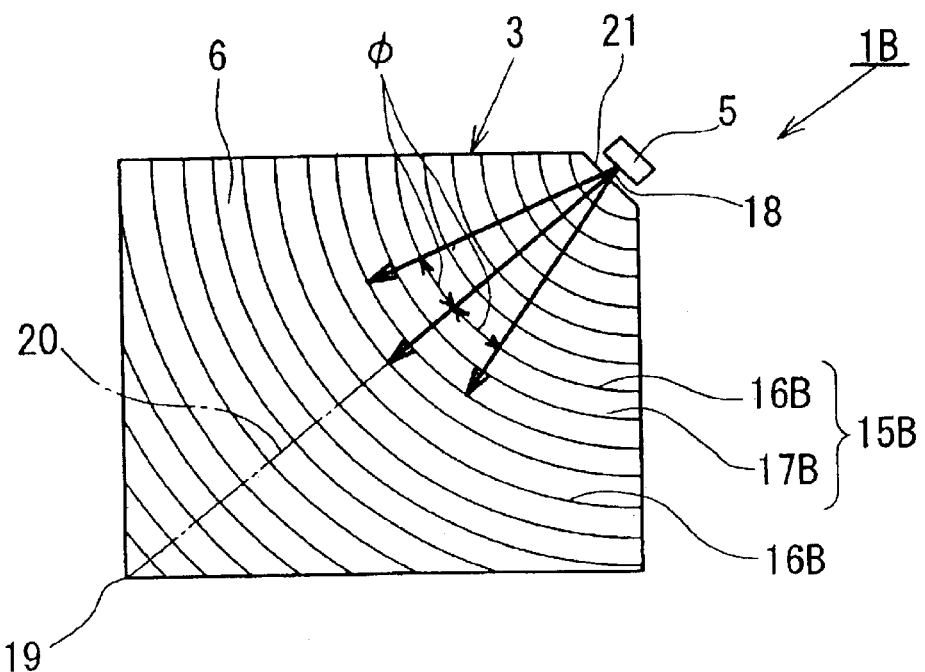
FIG. 1 is a front view of a spread illuminating apparatus according to a first embodiment of the present invention.

Referring to FIG. 1, the spread illuminating apparatus 1B comprises a light conductive plate 3 made of a light transmissible material and shaped substantially rectangular, and a spot-like light source 5 such as an LED disposed close to the light conductive plate 3.

A light entry face 21 is provided at a corner 18 of the light conductive plate 3 so at to be substantially orthogonal to a diagonal line 20 defined by connecting the corner 18 and a corner 19 diagonally opposite to the corner 18, and the light source 5 is disposed facing the light entry face 21. A light reflection pattern 15B is formed on a major surface 6 (hereinafter referred to as "top surface") of the light conductive plate 3, whereby uniform light emission is achieved all over the front surface F of the reflection-type liquid crystal element 2 (see FIG. 19) as described later.

The light refection pattern 15B comprises a plurality of arced grooves 16B and a plurality of flat portions 17B present between adjacent grooves 16B, 16B. The arced grooves 16B correspond to the partial circumferences of circles which are concentric with one another about the light source 16 and which have respective different radii.

Figure 2:
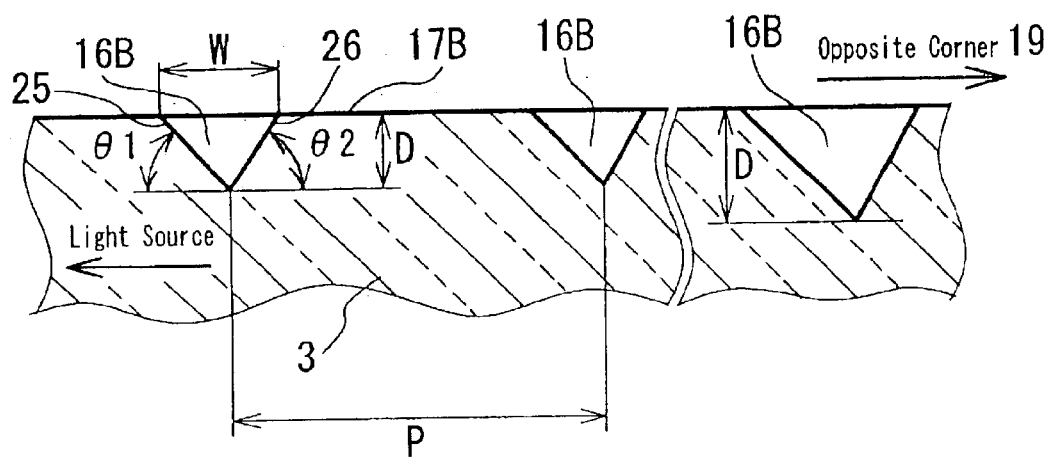
FIG. 2 is a schematic cross-sectional view of a light reflection pattern shown in FIG. 1.
Figures 3A, 3B, 3C, 3D:
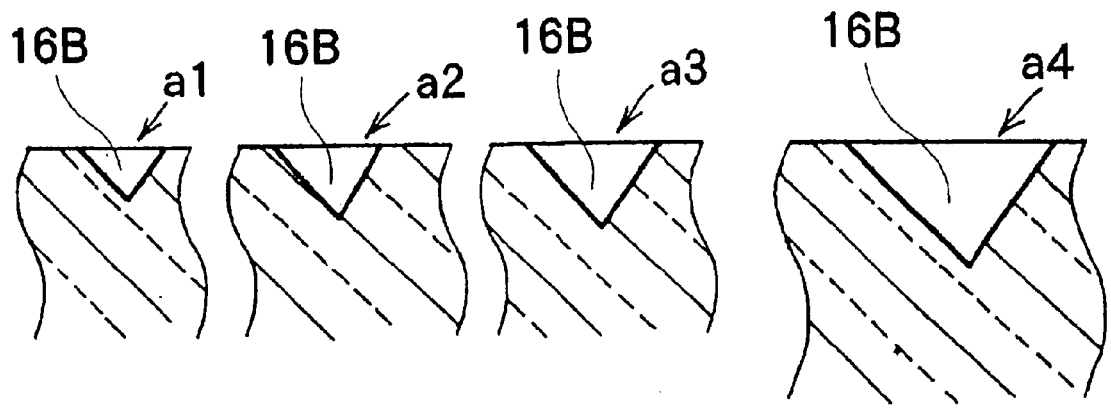
FIGS. 3A to 3D are schematic cross-sectional views of one same groove shown in FIG. 1, respectively showing points positioned circumferentially different from one another.

Referring to FIG. 2, the grooves 16B are triangular in section. An angle θ1 (hereinafter referred to as "first angle"), which is made by an imaginary datum line parallel to the flat portion 17B with respect to an inclination surface 25 constituting the groove 16B and positioned closer to the light source 5, has a predetermined value, and an angle θ2 (hereinafter referred to as "second angle"), which is made by the datum line with respect to an inclination surface 26 constituting the groove 16B, positioned farther from the light source 5 and disposed opposite to the inclination surface 25, has a predetermined value. The grooves 16B are arrayed at a constant interval P, and have their depths D increasing with an increase in the distance from the light source 5 (the distance from the light source 5 to the groove 16B concerned is hereinafter referred to as "distance L" as appropriate, though not shown in the figures). A symbol W indicates the width of the groove 16B.

As described above, the depth D increases with the increase of the distance L, that is with the increase of the radius of the circle whose partial circumference corresponds to the arced groove 16B, thereby achieving uniform spread emission from everywhere in the light conductive plate 3. Alternatively, the interval P between adjacent grooves 16B, 16B may be decreased with the increase of the distance L while the depth D of the grooves 16B is kept constant. Or, it may be such that with the increase of the distance L, the depth D of the groves 16 is increased as well as the interval P is decreased.

With regard to each one of the grooves 16B, the depth thereof increases continuously and gradually with an increase in the distance from the diagonal line 20, namely with an increase in the angle φ (emission angle) made by the diagonal line 20 with respect to a line segment defined between the light source 5 and a point concerned. For example, as shown in FIGS. 3A to 3D, one particular groove 16B has its depth increasing from a point a1 on the diagonal line 20 to points a2, a3, and a4 (see FIG. 4 for the points a1 to a4) in this sequence, the points a1 to a4 having their emission angles φ increasing in this sequence.

Figure 4:
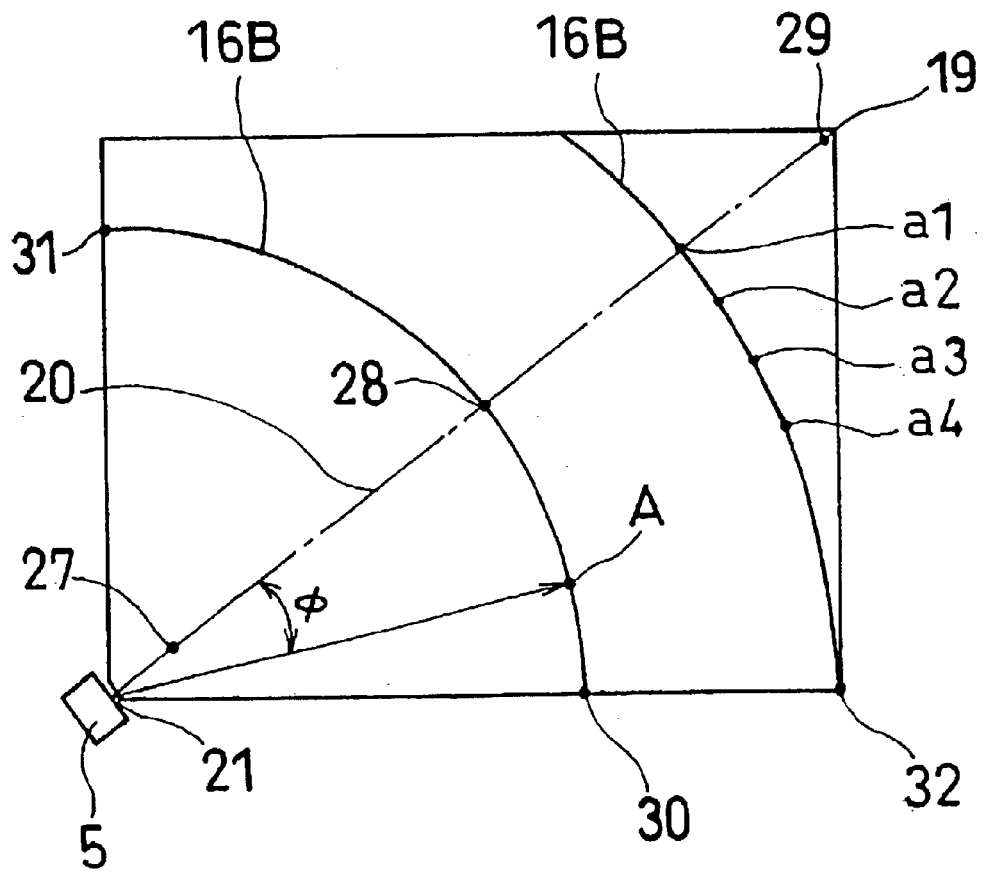
FIG. 4 is a schematic front view of a light conductive plate shown in FIG. 1.

Referring to FIG. 4, the grooves 16B have their depths increasing with the increase of the distance L, specifically, from a point 27, to points 28 and 29 in this sequence, all of which are positioned along the diagonal line 20, while one groove thereof, which includes the point 28, has its smallest depth at the point 28 and has its depth increasing continuously and gradually with an increase in the distance from the point 28, that is, with the increase of the emission angle φ thus having a larger depth at a point 31 than at a point 30 which involves a smaller emission angle φ than the point 31.

Figure 10:
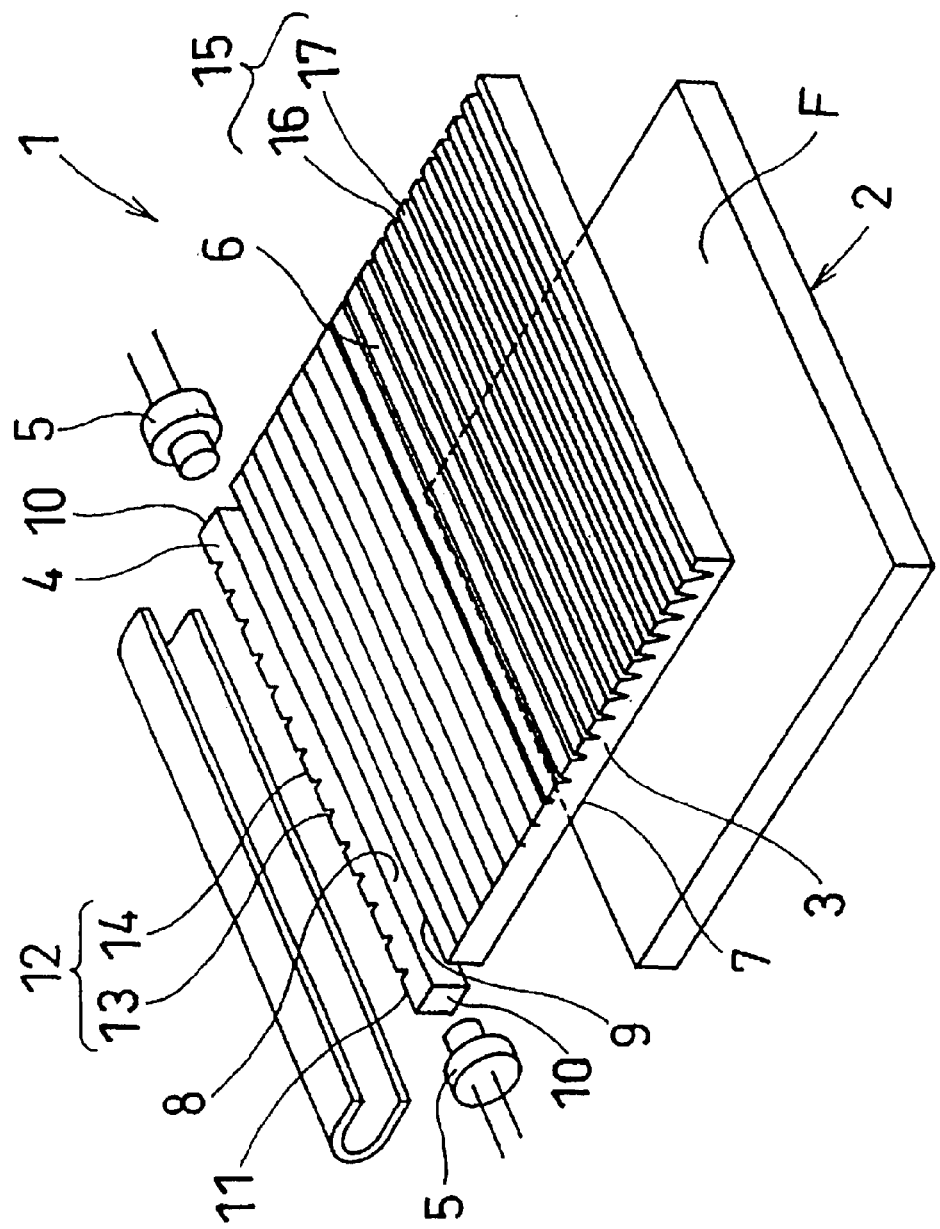
FIG. 10 is an exploded perspective view of a conventional illuminating apparatus including a light conductive bar.
Figure 11:
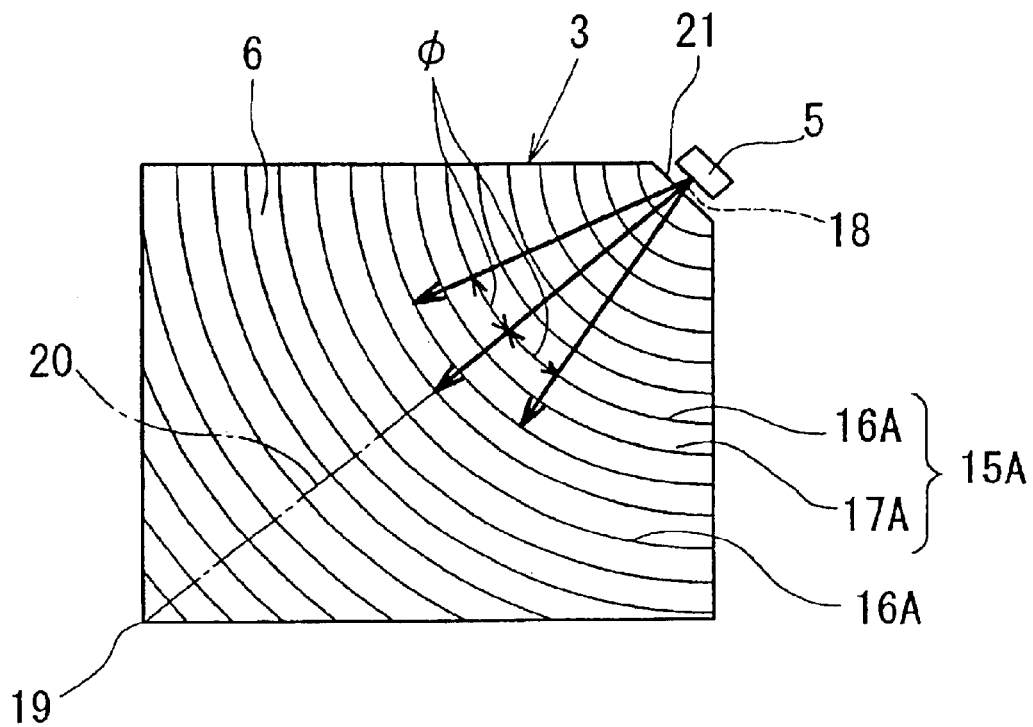
FIG. 11 is a front view of another conventional illuminating apparatus including no light conductive bar and having an LED disposed close to a corner of a light conductive plate.
Figure 12:
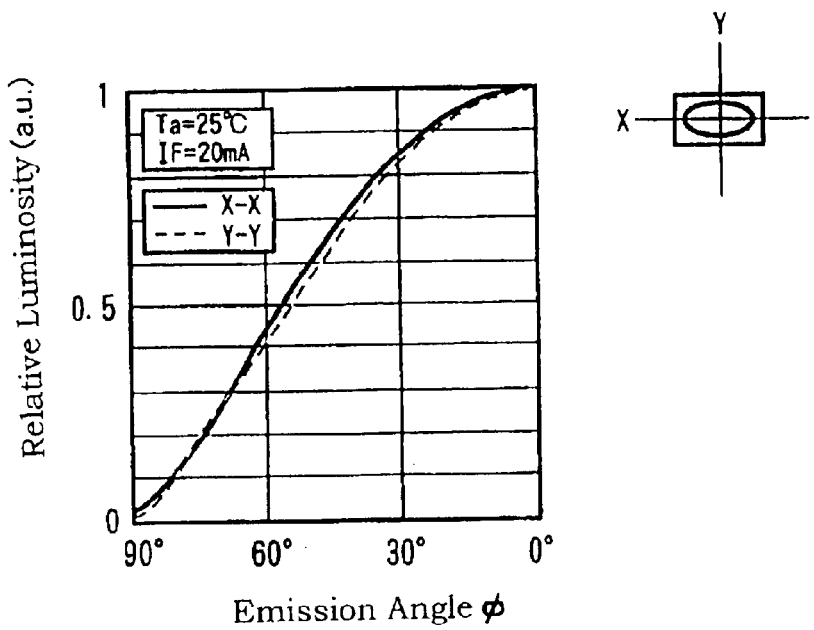
FIG. 12 is a graph showing a characteristic of a relative luminosity of an LED as a function of an emission angle.

In the spread illuminating apparatus 1B, the light conductive bar 4 used in the conventional spread illuminating apparatus 1 shown in FIG. 10 is eliminated, and light rays emitted from the light source 5 are introduced directly into the light conductive plate 3. The light rays introduced into the light conductive plate 3 progress radially toward the corner 19 while reflected and refracted repeatedly at the light reflection pattern 15B and other portions, and exit out in the meantime from the bottom surface 7 to illuminate the reflection-type liquid crystal element 2 disposed close to the bottom surface 7, thereby performing an emission (indirect emission) display by the reflection-type liquid fatal element 2.

Also, the light reflection pattern 15B is configured such that the grooves 16B have their depths D increasing with an increase in the distance from the light source 5 and also such that each of the grooves 16B has its depth increasing with an increase in the emission angle φ with respect to the diagonal line 20, thereby reflecting more light toward the reflection-type liquid crystal element 2 at an area positioned far from the light source 5 and the diagonal line 20 than at an area positioned at or close to the light source 5 and the diagonal line 20.

Figure 5:
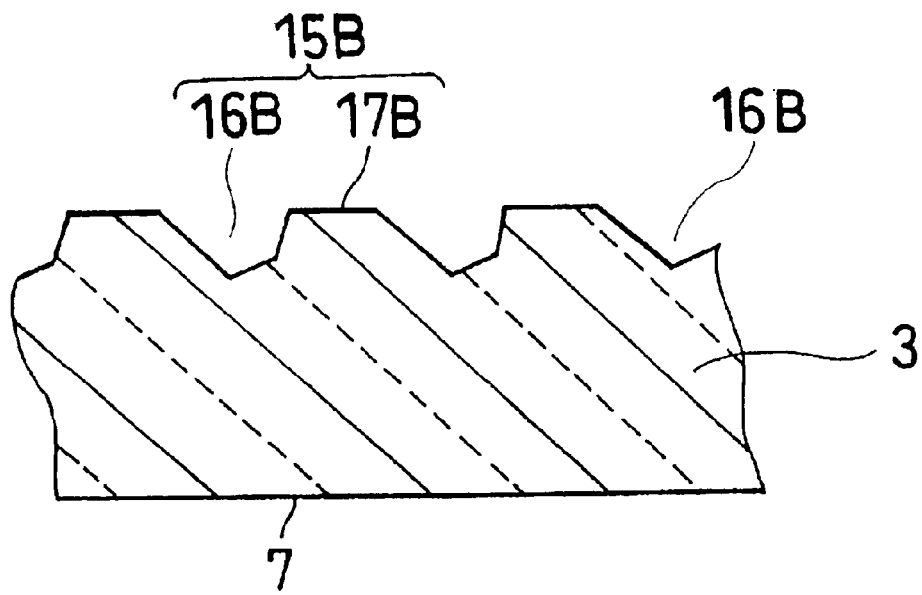
FIG. 5 is a schematic cross-sectional view of a light reflection pattern comprising grooves quadrangular in section in place of the ones triangular in section shown in FIG. 2.
Figure 6:
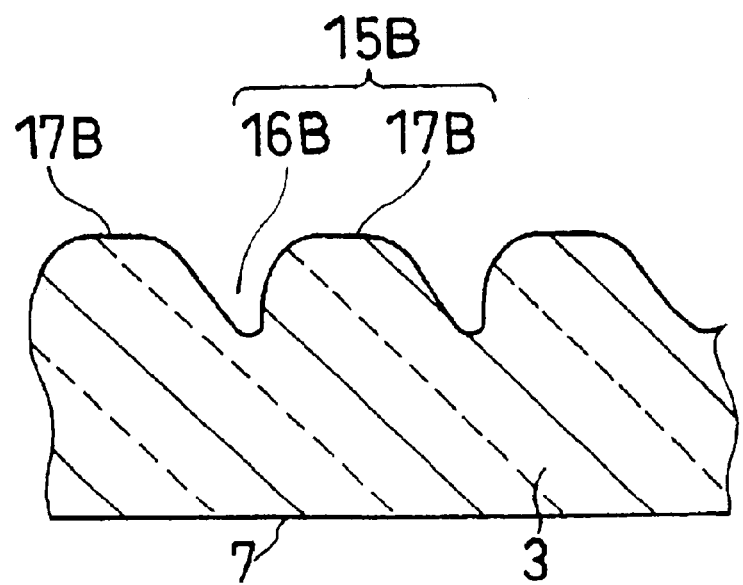
FIG. 6 is a schematic cross-sectional view of a light reflection pattern comprising grooves with curved surfaces.
Figure 7:
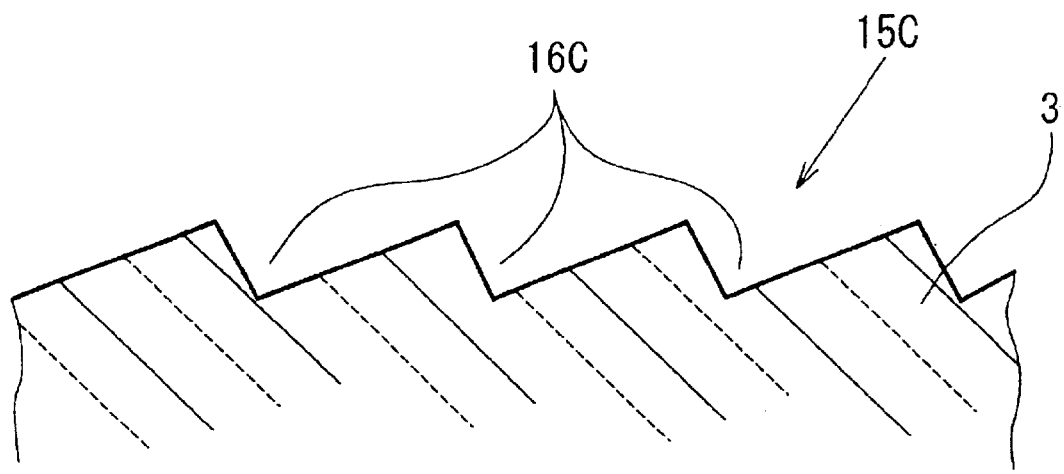
FIG. 7 is a schematic cross-sectional view of a light reflection pattern comprising continuous grooves triangular in section.
Figure 8:
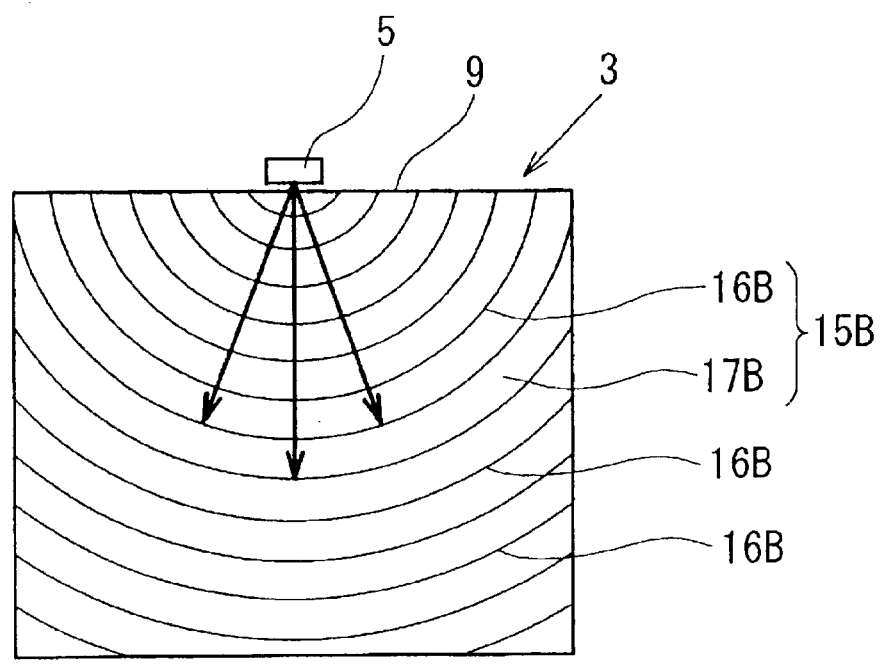
FIG. 8 is a schematic front view of a spread illuminating apparatus according to a second embodiment of the present invention, in which a spot-like light source is disposed close to an end surface of a light conductive plate.

In the above embodiment, the grooves 16B are shaped substantially triangular in section. The present invention is not limited thereto, and the grooves may be shaped quadrangular as shown in FIG. 5 or like any polygon, and further way be configured with a curve line.

The light reflection pattern 15B, which comprises the arced grooves 16B and the flat portions 17B in the embodiment, may be replaced with a light reflection pattern 15C (see FIG. 5) comprising a plurality of arced grooves 16C continuously provided without flat portions therebetween.

In the embodiment, the light entry face 21 is provided only at the corner 18 of the light conductive plate 3 and has the light source 5 disposed dose thereto or in contact therewith, but may be provided farther at other corners and have respective light sources 6 disposed thereat. And, the light source 5 may alternatively be disposed close to or in contact with an end surface 9 of the light conductive plate 3, rather than the light entry face 21, and further the end surface 9 may have two or more light sources 5 disposed thereon.

In the embodiment, the grooves 16B have their depths changing while the first and second inclination angles θ1 and θ2 are kept constant, resulting in the width W of the grooves 16B varying. The grooves 16 may alternatively have their depths changing while the first and second inclination angles θ1 and θ2 are varied, wherein the width W of the grooves 16B may possibly be set to be constant.

Also, in the embodiment, the light entry face 21 is substantially orthogonal to the diagonal line 20, but does not have to be so.

And, in the embodiment, the spread illuminating apparatus 1B is disposed over the front surface F (display surface) of the reflection-type liquid crystal element 2, but may alternatively be disposed under the back surface of what is illuminated, such as a transmission-type liquid crystal element.

EXAMPLE

An example of the present invention will be described with reference to FIG. 9 as well as FIGS. 1 to 4. The light conductive plate 8 was of rectangle measuring 46 mm×36 mm, and the interval P between adjacent grooves 16B, 16B was 100 μm. A point 32 was additionally defined to be positioned between the points 28 and 29 with regard to the distance L, and same as the point 30 with regard to the emission angle φ, and the emission angle φ, the distance L and the depth D of all the points 27 to 32 were set as shown in FIG. 9. The grooves 16B had their depths D increasing with the increase of the distance L and increasing with the increase of the emission angle φ with respect to the diagonal line 20. Here, the first and second inclination angles θ1 and θ2 were set at 50° and 70°, respectively.

In the example, the depth D at the point A shown in FIG. 4 was calculated by the following expression (L: mm):
$D=[(0.0229\times\phi^2+01892\times\phi+80.091)\times L^2+(1.3055\times\phi^3+0.1598\times\phi-1039.8)\times L+10180]\times 8.81207\times 10^{-5}$ The example of the spread illuminating apparatus 1B according to the present invention, which is provided with the above described light conductive plate 3, was proved to provide uniform spread emission all over the light conductive plate, ensuring excellent illuminating precision.

What is claimed is:

1. A spread illuminating apparatus comprising:
    a light conductive plate shaped substantially rectangular and made of a light transmissible material;
    a spot-like light source disposed close to or in contact with a light entry face provided at a corner of the light conductive plate; and
    a light reflection pattern formed on a major surface of the light conductive plate and comprising a plurality of arced grooves corresponding to partial circumferences of circles being concentric with one another about the light source and having respective different radii, the light reflection pattern having at least one of configurations such that the arced grooves have their depths increasing with art increase in a distance from the light source, and such that the arced grooves are arrayed at intervals decreasing with an increase in a distance from the light source, wherein etch of the arced grooves has its depth increasing continuously and gradually with an increase to a distance from a line defined to be orthogonal to the light entry face.

2. A spread illuminating apparatus according to claim 1, wherein each arced groove has its depth at a concerned point determined according to an angle made by the line orthogonal to the light entry face with respect to a line defined by connecting the point concerned and the light source.

3. A spread illuminating apparatus according to claim 1, wherein the light reflection pattern further comprises a plurality of flat portions each present between any two adjacent arced grooves.

4. A spread illuminating apparatus according to claim 1, wherein the light reflection pattern is configured such that the plurality of arced grooves are arrayed to be continuous with one another.

5. A spread illuminating apparatus according to claim 1, wherein the plurality of arced grooves are shaped substantially triangular in section.

6. A spread illuminating apparatus according to claim 2, wherein the light reflection pattern further comprises a plurality of flat portions each present between any two adjacent arced grooves.

7. A spread illuminating apparatus according to claim 2, wherein the light reflection pattern is configured such that the plurality of arced grooves are arrayed to be continuous with one another.

8. A spread illuminating apparatus according to claim 2, wherein the plurality of arced grooves are shaped substantially triangular in section.

9. A spread illuminating apparatus according to claim 3, wherein the plurality of arced grooves are shaped substantially triangular in section.

10. A spread illuminating apparatus according to claim 4, wherein the plurality of arced grooves are shaped substantially triangular in section.

* * * * *